United States Patent
Kim (10) Patent No.: US 11,628,884 B2
(45) Date of Patent: Apr. 18, 2023

(54) FRONT BODY STRUCTURE

(71) Applicants: Hyundai Motor Company, Seoul (KR); Kia Corporation, Seoul (KR)

(72) Inventor: Eonpyo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/462,811

(22) Filed: Aug. 31, 2021

(65) Prior Publication Data

US 2022/0266911 A1   Aug. 25, 2022

(30) Foreign Application Priority Data

Feb. 25, 2021   (KR) .................. 10-2021-0025319

(51) Int. Cl.
*B62D 21/15*   (2006.01)
*B62D 27/02*   (2006.01)

(52) U.S. Cl.
CPC ......... *B62D 21/152* (2013.01); *B62D 27/023* (2013.01)

(58) Field of Classification Search
CPC ................ B62D 25/20; B62D 25/2009; B62D 25/2018; B62D 25/08; B62D 21/152; B62D 27/023
USPC ....... 296/187.01, 187.1, 203.01–2, 4, 29, 30
See application file for complete search history.

(56) References Cited

U.S. PATENT DOCUMENTS 9,981,694 B2   5/2018   Sekiguchi et al.

FOREIGN PATENT DOCUMENTS

JP   2013-193572 A   9/2013
JP   2015-054590 A   3/2015

*Primary Examiner* — Dennis H Redder
(74) *Attorney, Agent, or Firm* — Fox Rothschild LLP (57) ABSTRACT

A front vehicle body structure includes a front side member that is connected to a front mounting bracket, and a front side upper member that is spaced apart from the front side member in the vehicle body width direction. The front side upper member is also connected to the front mounting bracket.

19 Claims, 8 Drawing Sheets

FRONT BODY STRUCTURE

CROSS-REFERENCE TO RELATED APPLICATION

This application claims priority to and the benefit of Korean Patent Application No. 10-2021-0025319 filed on Feb. 25, 2021, the entire contents of which are incorporated herein by reference.

BACKGROUND OF THE DISCLOSURE

(a) Field of the Disclosure

The present disclosure relates to a front body structure, and more particularly, to a front body structure capable of responding to a small overlap collision.

(b) Description of the Related Art

As a way to secure vehicle safety, the response to small overlap test is being emphasized. Among the small overlap test, US safety regulations require that, in the small overlap front test, the vehicle travels at 40 mph toward the barrier and 25% of the vehicle's front end overlaps the barrier. This test mimics the situation that occurs when one corner of the front of a vehicle collides with another vehicle or an obstacle such as a tree or a telephone pole.

In response to this test, the fender apron upper member is extended to the front part of the FEM mounting, and in the event of a collision with the barrier, the collision load is transmitted to the A-pillar through the upper member overlapping the barrier. At this time, the upper member cross-section is composed of zero matching in contact with the front side member cross-section in the width direction. In other words, there is a possibility that the collision energy may not be properly distributed because the overlap area in the vehicle body width direction between the cross section of the upper member to which the collision load is transmitted and the cross section of the front side member is not sufficient.

The above information disclosed in this section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a front body structure capable of responding to a small overlap collision by securing a cross section in the vehicle body width direction in front of the vehicle body.

A front vehicle body structure according to an exemplary embodiment of the present disclosure may include a front side member connected to a front mounting bracket, and a front side upper member spaced apart from the front side member in the vehicle body width direction and connected to the front mounting bracket. The front vehicle body structure according to an exemplary embodiment of the present disclosure may further include a front side member bracket that connects the front mounting bracket, the front side member and the front side upper member.

The front side member bracket may include a rear portion coupled to the front side member. The rear portion may be inclined in the rear direction of the vehicle body. The front side member bracket may include a rear stepped portion formed with a step in the rear portion. The front side member bracket may include a rear flange that is curved in the rear portion and coupled to the front side member. The front side member bracket may further include an upper bracket that connects the front mounting bracket and the front side member, and a lower bracket that connects the front mounting bracket and the front side member, and is mounted on the lower part of the upper bracket.

The upper bracket may include an upper bracket side surface that connects the front mounting bracket and the rear portion, an upper bracket upper surface that connects the front mounting bracket, the front side member, the rear portion and the upper bracket side surface, and an upper bracket lower surface that connects the front mounting bracket, the front side member, the rear portion and the upper bracket side surface. The upper bracket may include an upper bracket side flange curved from the upper bracket side surface and connected to the front mounting bracket, an upper bracket upper flange that extends from the upper bracket upper surface and connected to the upper portion of the front side member, and an upper bracket lower flange curved from the upper bracket lower surface and connected to the side of the front side member. The upper bracket may include a side surface stepped portion formed in a step on the upper bracket side surface and welded with the lower bracket.

A welding hole may be formed on the upper bracket upper surface and the upper bracket lower surface, respectively. The front mounting bracket may have a front mounting bracket welding hole that communicates with the welding hole of the upper bracket. The lower bracket may include a lower bracket side surface connected to the front mounting bracket and the upper bracket side surface, and a lower bracket rear surface formed curved in the lower bracket side surface and connected to the rear portion and the front side member. The lower bracket may include a lower bracket front flange curved in the lower bracket side surface and connected to the front mounting bracket, and a lower bracket rear flange that is curved on the lower bracket rear surface and connected to the front side member.

The front vehicle body structure according to an exemplary embodiment of the present disclosure may further include a lower bracket bulk head mounted inside the lower bracket and the front mounting bracket. The front side upper member may include a front side upper inner member connected to the rear of the front mounting bracket and spaced apart from the front side member and connected to the upper surface of the upper bracket, and a front side upper outer member connected to the front mounting bracket, the upper bracket side surface and the rear portion, and coupled to the front side upper inner member. The front side upper member may include a front side upper inner member upper flange extending upward from the front side upper inner member, and a front side upper outer member upper flange that extends upward from the front side upper outer member and coupled to the front side upper inner member upper flange.

The front vehicle body structure according to an exemplary embodiment of the present disclosure may further include a front side bulk head provided in the front side member adjacent to a position where the rear portion connected to the front side member. The front mounting bracket may include a front mounting bracket protrusion formed protrude to be connected with the front side member.

The front side member may include a front side member first unit having a front side member inner body connected with the front mounting bracket protrusion, and an inner body upper flange and an inner body lower flange bent in the upper and lower directions from the front side member inner body, and a front side member second unit having a front side member outer body connected with the front mounting bracket protrusion, and an outer body upper flange and an outer body lower flange formed to be bent in the upper and lower directions from the front side member outer body and coupled to the inner body upper flange and the inner body lower flange, respectively.

According to the front vehicle body structure according to an exemplary embodiment of the present disclosure, the vehicle body width direction cross-section of the front part of the vehicle body corresponding to the front collision of the vehicle is increased, and appropriate collision load distribution is possible during a small overlap collision. In addition, the effects that may be obtained or predicted by an exemplary embodiment of the present disclosure will be disclosed directly or implicitly in the detailed description of an exemplary embodiment of the present disclosure. In other words, various effects predicted according to an exemplary embodiment of the present disclosure will be disclosed within a detailed description to be described later.

BRIEF DESCRIPTION OF THE DRAWINGS

Since these drawings are for reference in describing an exemplary embodiment of the present disclosure, the technical spirit of the present disclosure should not be construed as being limited to the accompanying drawings.

FIG. 3 is partial perspective view excluding the front side upper outer member in

FIG. 1.

FIG. 4 is a partial perspective view excluding the front side upper inner member in

FIG. 3.

DESCRIPTION OF SYMBOLS

10: front mounting bracket
12: front mounting bracket welding hole
14: front mounting bracket protrusion
20: front side member
22: front side member first unit
24: front side member inner body
26: inner body upper flange
28: inner body lower flange
32: front side member second unit
34: front side member outer body
36: outer body upper flange
38: outer body lower flange
40: front side upper member
42: front side upper inner member
44: front side upper inner member upper flange
46: front side upper outer member
48: front side upper outer member upper flange
60: front side member bracket
62: rear portion
64: rear stepped portion
66: rear flange
70: upper bracket
72: upper bracket side surface
74: upper bracket side flange
76: side surface stepped portion
80: upper bracket upper surface
82: welding hole
84: upper bracket upper flange
85: upper bracket upper front flange
90: upper bracket lower surface
92; upper bracket lower flange
94: welding hole
100: lower bracket
110: lower bracket side surface
112: lower bracket front flange
114: lower bracket rear surface
116: lower bracket rear flange
120: lower bracket bulk head
130: front side bulk head
140; sub-frame mounting rear reinforcement
142: sub-frame mounting bolt
150: wheel guard
160: small overlap barrier

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clearly explain the present disclosure, parts irrelevant to the description are omitted, and the same reference numerals are assigned to the same or similar elements throughout the specification. The size and thickness of each component shown in the drawings are arbitrarily shown for convenience of description, and the present disclosure is not necessarily limited to the bar shown in the drawings, and the thickness is enlarged to clearly express various parts and regions.

In addition, in the following detailed description, the names of the components are divided into first, second, and the like to distinguish them in the same relationship, and the order is not necessarily limited in the following description. Throughout the specification, when a part includes a certain component, it means that other components may be further included, rather than excluding other components, unless otherwise stated. In addition, terms such as . . . part, . . . means described in the specification mean a unit of a comprehensive configuration that performs at least one function or operation. When a part, such as a layer, film, region, plate, etc., is "on" another part, it includes not only the case where it is directly above the other part, but also the case where there is another part in between. In contrast, when an element is referred to as being "directly on" another element, there are no intervening elements present.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
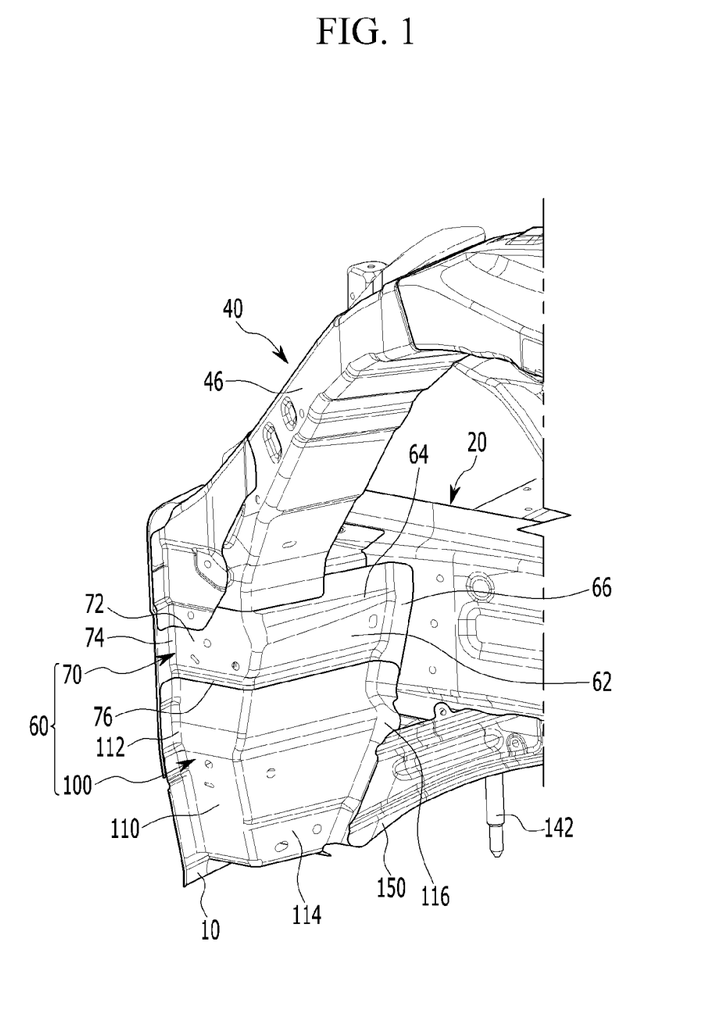
FIG. 1 is a perspective view of the front vehicle body structure according to an exemplary embodiment of the present disclosure.

An exemplary embodiment of the present disclosure will hereinafter be described in detail with reference to the accompanying drawings. FIG. 1 is a perspective view of the front vehicle body structure according to an exemplary embodiment of the present disclosure, and FIG. 2 is a top plan view of the front vehicle body structure according to an exemplary embodiment of the present disclosure.

Figure 2:
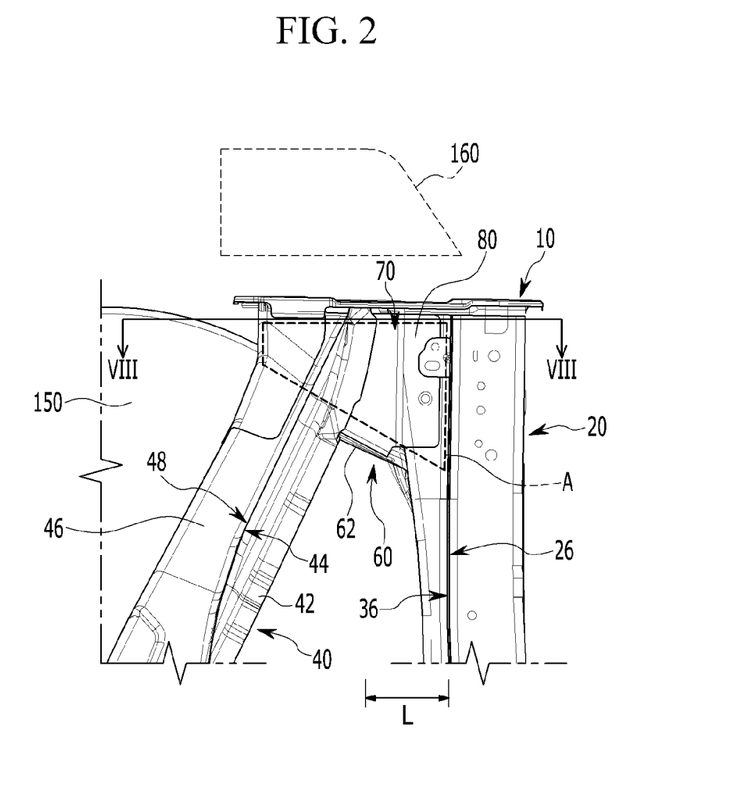
FIG. 2 is a top plan view of the front vehicle body structure according to an exemplary embodiment of the present disclosure.

Referring to FIG. 1 and FIG. 2, the front vehicle body structure according to an exemplary embodiment of the present disclosure may include a front side member 20 connected to a front mounting bracket 10, and a front side upper member 40 spaced apart from the front side member 20 in the vehicle body width direction and connected to the front mounting bracket 10. The front vehicle body structure according to an exemplary embodiment of the present disclosure may further include a front side member bracket 60 connecting the front mounting bracket 10, the front side member 20 and the front side upper member 40.

As shown in FIG. 2, the front vehicle body structure according to the present disclosure is provided with the front side upper member 40 spaced apart from the front side member 20 in the vehicle body width direction. In general, the front side upper member and the front side member are matched to each other with a zero relative position in the vehicle body width direction. Therefore, in collision with the small overlap barrier, the front cross-section where the front side upper member and front side member contact the small overlap barrier is relatively small, so the collision load distribution may not be effective.

However, in the front vehicle body structure according to an exemplary embodiment of the present disclosure, the width direction length of the vehicle body formed by the front side upper member 40 and the front side member 20 may be relatively long as much as "L" indicated. Therefore, the collision load distribution through the front side upper member 40 and the front side member 20 may be effectively performed when colliding with the small overlap barrier 160. The front side member bracket 60 may include a rear portion 62 connected with the front side member 20. The rear portion 62 may be inclined in the rear direction of the vehicle body.

Figure 3:
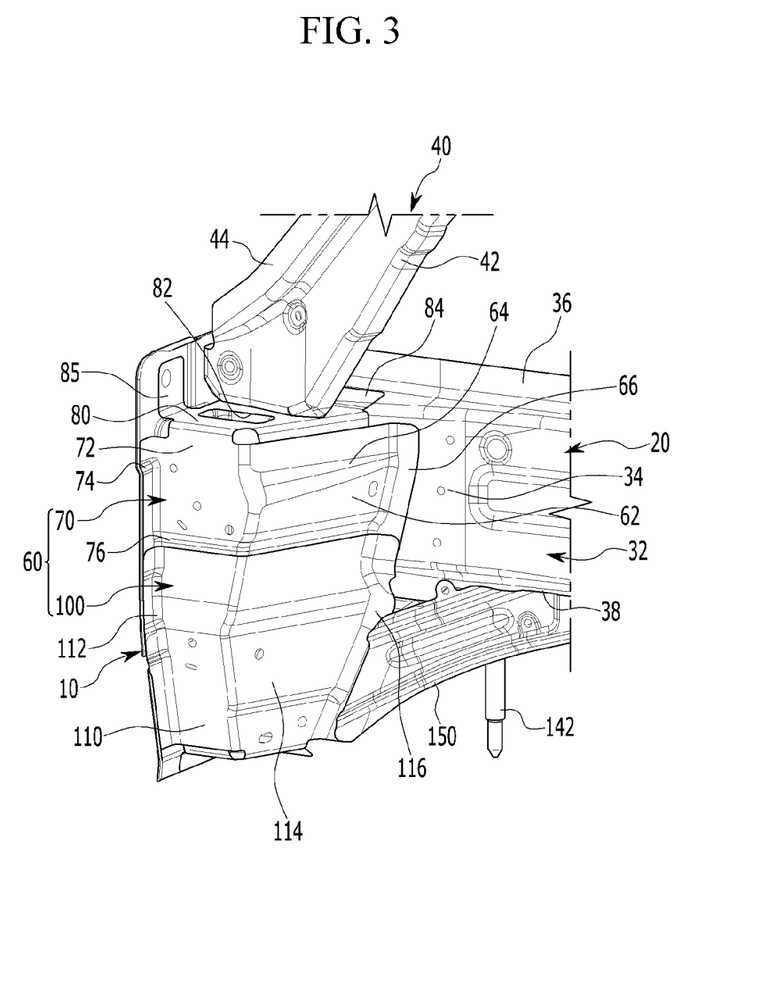
Figure 4:
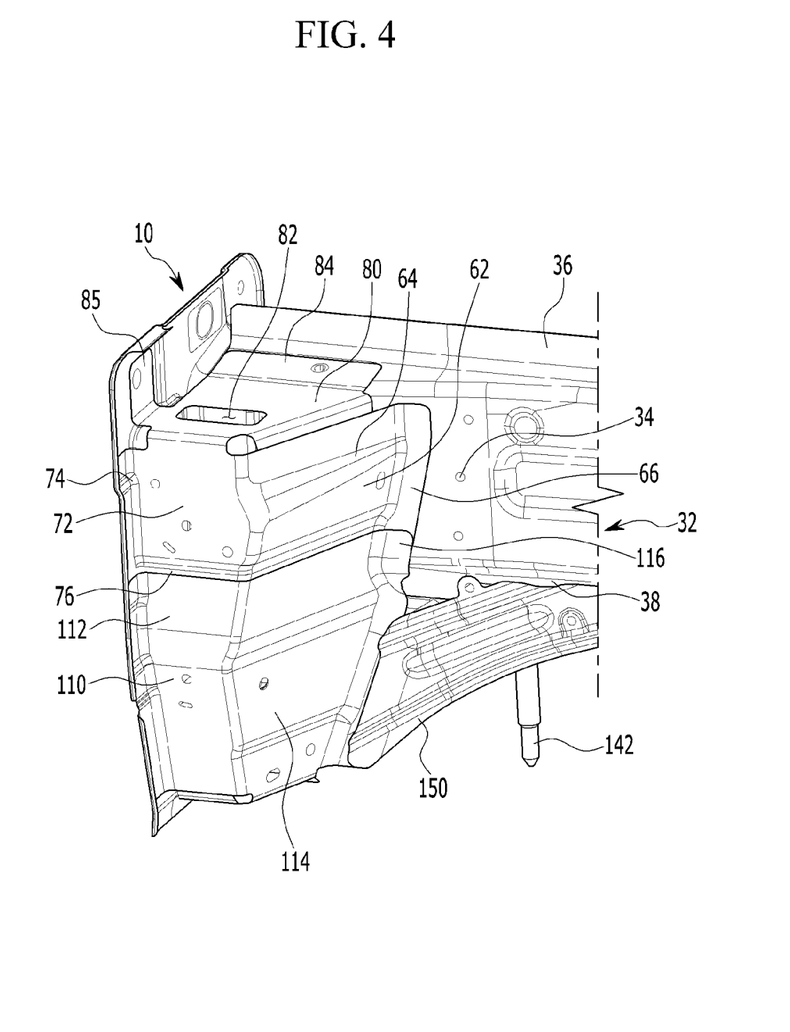
Figure 5:
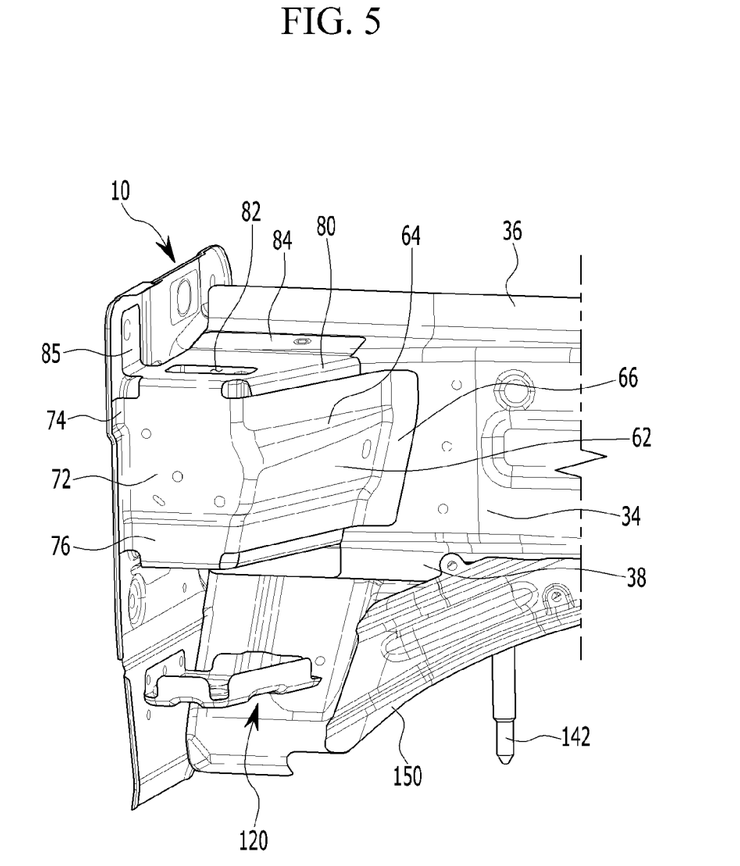
FIG. 5 is a partial perspective view excluding the lower bracket in FIG. 4.
Figure 6:
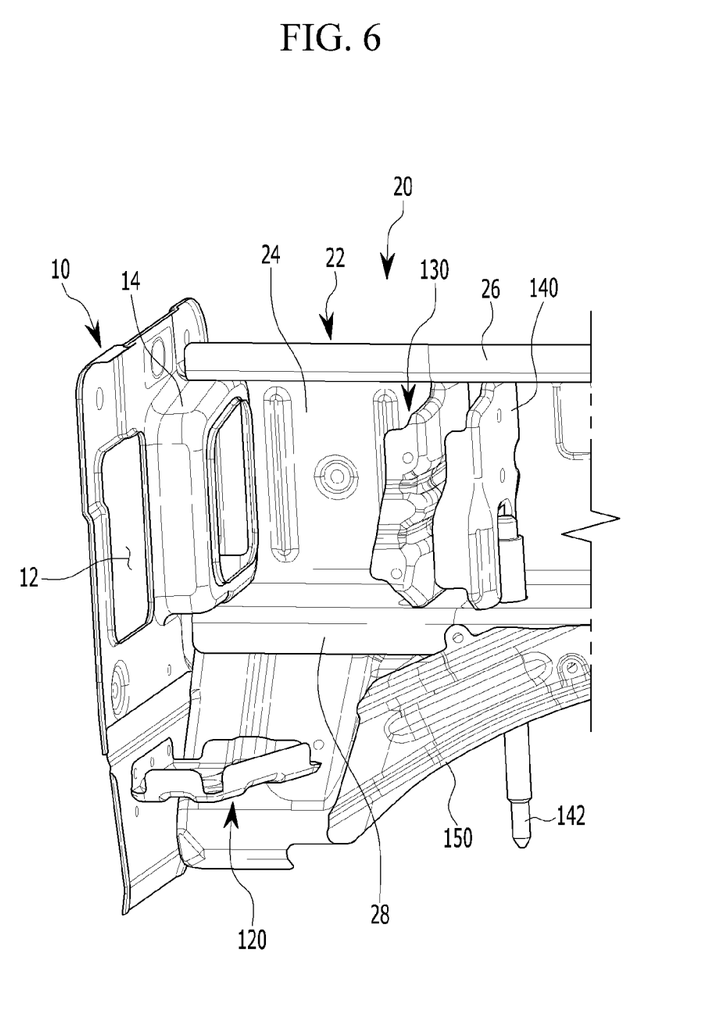
FIG. 6 is a partial perspective view, excluding the upper bracket and front side member second unit in FIG. 5.
Figure 7:
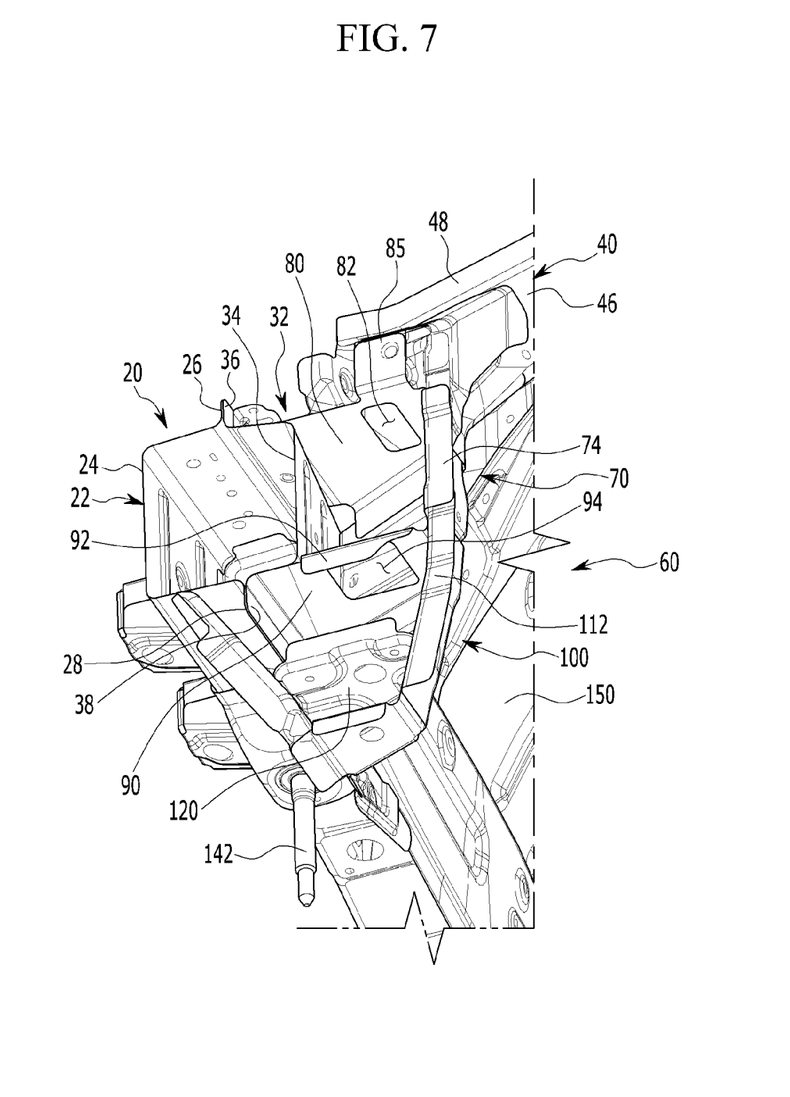
FIG. 7 is a partial perspective view excluding the front mounting bracket of the front vehicle body structure according to an exemplary embodiment of the present disclosure.

FIG. 3 is partial perspective view excluding the front side upper outer member in FIG. 1, and FIG. 4 is a partial perspective view excluding the front side upper inner member in FIG. 3. FIG. 5 is a partial perspective view excluding the lower bracket in FIG. 4, and FIG. 6 is a partial perspective view, excluding the upper bracket and front side member second unit in FIG. 5. FIG. 7 is a partial perspective view excluding the front mounting bracket of the front vehicle body structure according to an exemplary embodiment of the present disclosure.

Hereinafter, referring to FIG. 1 to FIG. 7, the front vehicle body structure according to an exemplary embodiment of the present disclosure will be described in more detail. The front side member bracket 60 may include a rear stepped portion 64 formed with a step in the rear portion 62. The curved shape of the rear stepped portion 64 may increase the strength of the rear portion 62 of the front side member bracket 60.

The front side member bracket 60 may include a rear flange 66 that is curved in the rear portion 62 and coupled to the front side member 20. The front side member bracket 60 may be welded to the front side member 20 via the rear flange 66. The front side member bracket 60 may further include an upper bracket 70 connecting the front mounting bracket 10 and the front side member 20, and a lower bracket 100 that connects the front side member 20 and mounted on a lower portion of the upper bracket 70.

The upper bracket 70 may include an upper bracket side surface 72 that connects the front mounting bracket 10 and the rear portion 62. The upper bracket 70 may also include an upper bracket upper surface 80 that connects the front mounting bracket 10, the front side member 20, the rear portion 62 and the upper bracket side surface 72. The upper bracket 70 may also include an upper bracket lower surface (90; referring to FIG. 7) that connects the front mounting bracket 10, the front side member 20, the rear portion 62 and the upper bracket side surface 72.

The upper bracket 70 may further include an upper bracket side flange 74 curved from the upper bracket side surface 72 and connected with the front mounting bracket 10, an upper bracket upper flange 84 that extends from the upper bracket upper surface 80 and coupled to the upper portion of the front side member 20, and an upper bracket lower flange 20 (92; referring to FIG. 7) curved from the upper bracket lower surface 90 and connected to the side of the front side member. In other words, the upper bracket may be welded to the front side member 20 in the width direction of the vehicle body through the rear flange 66, and to the front side member 20 in the height direction of the vehicle body through the upper bracket upper flange 84. Accordingly, the upper bracket 70 may be coupled to the front side member 20 in the width direction and height direction of the vehicle body, so that the coupling between the upper bracket 70 and the front side member 20 may be made more robust.

The upper bracket 70 may further include an upper bracket upper front flange 85 that is curved from the upper bracket upper surface 80 and coupled to the front mounting bracket 10. The upper bracket 70 may include a side surface stepped portion 76 that is formed with a step difference in the upper bracket side surface 72 and is welded to the lower bracket 100. The strength of the upper bracket side surface 72 may be secured by the stepped shape of the side surface stepped portion 76.

Welding holes (82, 94; referring to FIG. 7) may be formed in the upper bracket upper surface 80 and the upper bracket lower surface 90, respectively. The front mounting bracket 10 may be formed with a front mounting bracket welding hole 12 that communicates with the welding holes 82, and 94 of the upper bracket 70. The welding process may be performed by inserting a welding gun (not shown) into the front mounting bracket welding hole 12 and the welding holes 82 and 94 of the upper bracket 70.

The lower bracket 100 may include a lower bracket side surface 110 connected to the front mounting bracket 10 and the upper bracket side surface 72, and a lower bracket rear surface 114 curved from the lower bracket side surface 110 and connected to the rear portion 62 and the front side member 20. The lower bracket 100 may further include a lower bracket front flange 112 formed curved in the lower bracket side surface 110 and connected to the front mounting bracket 10, and a lower bracket rear flange 116 that is curved in the lower bracket rear surface 114 and connected to the front side member 20.

The front vehicle body structure according to an exemplary embodiment of the present disclosure may further include a lower bracket bulk head 120 provided inside the lower bracket 100 and the front mounting bracket 10. The lower bracket bulk head 120 strengthens the coupling of the lower bracket 100 and the front mounting bracket 10 and may distribute the vehicle front impact load. The front side upper member 40 may include a front side upper inner member 42 that is connected to the rear of the front mounting bracket 10 and spaced apart from the front side member 20 and connected to the upper surface of the upper bracket 80, and a front side upper outer member 46 connected to the front mounting bracket 10, the upper bracket side surface 72 and the rear portion 62, and engaged with the front side upper inner member 42. In other words, as shown in FIG. 1 to FIG. 3, the front side upper inner member 42 is spaced apart from the front side member 20 and coupled to the upper bracket upper surface 80, and the front side upper outer member 46 surrounds the upper bracket 70 and may be welded. Therefore, the front side upper member 40 may be firmly coupled to the upper bracket 70.

Referring to FIG. 2, FIG. 3 and FIG. 7, the front side upper member 40 may include a front side upper inner member upper flange 44 that extends upward from the front side upper inner member 42, and a front side upper outer member upper flange 48 extending upward from the front side upper outer member 46 and coupled to the front side upper inner member upper flange 44. The front side upper inner member upper flange 44 and the front side upper outer member upper flange 48 may be welded to couple the front side upper inner member 42 the front side upper outer member 46. In addition, the front side upper inner member upper flange 44 and the front side upper outer member upper flange 48 may distribute the collision load in front of the vehicle body to the rear of the vehicle body when the vehicle body collides.

Referring to FIG. 6, the front mounting bracket 10 may include a front mounting bracket protrusion 14 protruded to engage the front side member 20. The front side member 20 may include a front side member first unit 22 having a front side member inner body 24 coupled with the front mounting bracket protrusion 14 and an inner body upper flange 26 and an inner body lower flange 28 bent in the upper and lower directions from the front side member inner body 24.

In addition, referring to FIG. 3, the front side member 20 may include a front side member second unit 32 having a front side member outer body 34 coupled with the front mounting bracket protrusion 14, and an outer body upper flange 36 and an outer body lower flange 38 curved in the upper and lower directions from the front side member outer body 34. The outer body upper flange 36 and the outer body lower flange 38 may be welded to the inner body upper flange 26 and the inner body lower flange 28, respectively. In addition, along the length direction of the front side member 20, the outer body upper flange 36 and the outer body lower flange 38 and the inner body upper flange 26 and the inner body lower flange 28 are coupled. Accordingly, the strength of the vehicle body length direction of the front side member 20 may be increased.

Referring to FIG. 6, a wheel guard 150 may be provided at a lower portion of the front side member 20, and a sub-frame mounting rear reinforcement 140 that supports a sub-frame mounting bolt 142 may be provided on the inside of the front side member 20.

Figure 8:
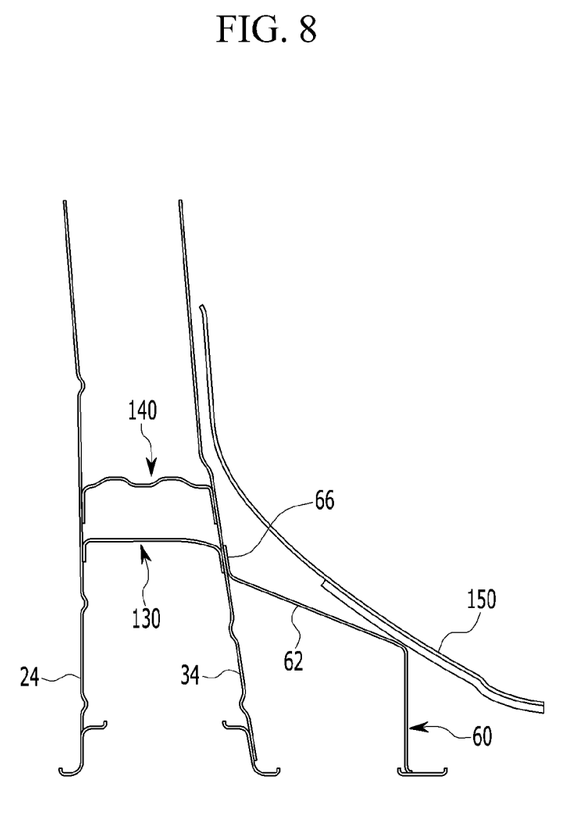
FIG. 8 is a cross-sectional view along the line VIII-VIII of FIG. 2.

FIG. 8 is a cross-sectional view along the line VIII-VIII of FIG. 2. Referring to FIG. 6 and FIG. 8, the front vehicle body structure according to an exemplary embodiment of the present disclosure may further include a front side bulk head 130 provided in the front side member 20 adjacent to the position where the rear portion 62 is coupled with the front side member 20.

Referring to FIG. 2 and FIG. 8, the rear portion 62 is inclined in the rear direction of the vehicle body so that the planar shape of the front side member bracket 60 may be generally a rhombus shape. Therefore, the cross-section size may be maximized corresponding to the shape of the wheel guard 150. Additionally, through the flat shape of the front side member bracket 60, the impact load transmitted to the front side member bracket 60 may be properly distributed to the front side member 20.

In addition, as shown in FIG. 2, in case of collision in front of vehicle, the front side member bracket 60 may be rotated anticlockwise, but the front side bulk head 130 is disposed in the front side member 20 adjacent to the position where the rear portion 62 engages the front side member 20 to prevent the front side member bracket 60 from penetrating into the front side member 20.

Referring to FIG. 7, the front side member bracket 60 may be formed of two components, the upper bracket 70 and the lower bracket 100, and has a generally "H" shape cross-section. Accordingly, the strength of the front side member bracket 60 may be secured, and the impact load transmission effect may be increased. In addition, welding work is possible through the front mounting bracket welding hole 12 and the welding holes 82, and 94 of the upper bracket 70, so welding work may be done easily.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A front vehicle body structure, comprising:
   a front side member connected to a front mounting bracket; and
   a front side upper member spaced apart from the front side member in the vehicle body width direction and connected to the front mounting bracket,
   wherein the front mounting bracket includes a front mounting bracket protrusion formed to be connected with the front side member.

2. The front vehicle body structure of claim 1, further comprising
   a front side member bracket that connects the front mounting bracket, the front side member, and the front side upper member.

3. The front vehicle body structure of claim 2, wherein the front side member bracket includes a rear portion coupled to the front side member.

4. The front vehicle body structure of claim 3, wherein the rear portion is inclined in the rear direction of the vehicle body.

5. The front vehicle body structure of claim 3, wherein the front side member bracket includes a rear stepped portion formed with a step in the rear portion.

6. The front vehicle body structure of claim 3, wherein the front side member bracket includes a rear flange that is curved in the rear portion and coupled to the front side member.

7. The front vehicle body structure of claim 3, wherein the front side member bracket further includes:
   an upper bracket that connects the front mounting bracket and the front side member; and
   a lower bracket that connects the front mounting bracket and the front side member, and is mounted on the lower part of the upper bracket.

8. The front vehicle body structure of claim 7, wherein the upper bracket includes:
   an upper bracket side surface that connects the front mounting bracket and the rear portion;
   an upper bracket upper surface that connects the front mounting bracket, the front side member, the rear portion and the upper bracket side surface; and
   an upper bracket lower surface that connects the front mounting bracket, the front side member, the rear portion and the upper bracket side surface.

9. The front vehicle body structure of claim 8, wherein the upper bracket includes:
   an upper bracket side flange curved from the upper bracket side surface and connected to the front mounting bracket;
   an upper bracket upper flange that extends from the upper bracket upper surface and connected to the upper portion of the front side member; and
   an upper bracket lower flange curved from the upper bracket lower surface and connected to the side of the front side member.

10. The front vehicle body structure of claim 8, wherein the upper bracket includes a side surface stepped portion formed in a step on the upper bracket side surface and welded with the lower bracket.

11. The front vehicle body structure of claim 8, wherein a welding hole is formed on the upper bracket upper surface and the upper bracket lower surface, respectively.

12. The front vehicle body structure of claim 11, wherein the front mounting bracket has a front mounting bracket welding hole that communicates with the welding hole of the upper bracket.

13. The front vehicle body structure of claim 8, wherein the lower bracket includes:
   a lower bracket side surface connected to the front mounting bracket and the upper bracket side surface; and
   a lower bracket rear surface formed curved in the lower bracket side surface and connected to the rear portion and the front side member.

14. The front vehicle body structure of claim 13, wherein the lower bracket includes:
   a lower bracket front flange curved in the lower bracket side surface and connected to the front mounting bracket; and
   a lower bracket rear flange that is curved on the lower bracket rear surface and connected to the front side member.

15. The front vehicle body structure of claim 13, further comprising:
   a lower bracket bulk head mounted inside a region defined by the lower bracket and the front mounting bracket.

16. The front vehicle body structure of claim 8, wherein the front side upper member includes:
   a front side upper inner member connected to the rear of the front mounting bracket and spaced apart from the front side member and connected to the upper surface of the upper bracket; and
   a front side upper outer member connected to the front mounting bracket, the upper bracket side surface and the rear portion, and coupled to the front side upper inner member.

17. The front vehicle body structure of claim 16, wherein the front side upper member includes:
   a front side upper inner member upper flange that extends upward from the front side upper inner member; and
   a front side upper outer member upper flange that extends upward from the front side upper outer member and coupled to the front side upper inner member upper flange.

18. The front vehicle body structure of claim 3, further comprising:
   a front side bulk head disposed in the front side member adjacent to a position where the rear portion connected to the front side member.

19. The front vehicle body structure of claim 1, wherein the front side member includes:
   a front side member first unit having a front side member inner body connected with the front mounting bracket protrusion, and an inner body upper flange and an inner body lower flange bent in the upper and lower directions from the front side member inner body; and
   a front side member second unit having a front side member outer body connected with the front mounting bracket protrusion, and an outer body upper flange and an outer body lower flange formed to be bent in the upper and lower directions from the front side member outer body and coupled to the inner body upper flange and the inner body lower flange, respectively.

* * * * *